(12) United States Patent
Kanda et al.

(10) Patent No.: US 6,484,736 B1
(45) Date of Patent: Nov. 26, 2002

(54) METHOD AND APPARATUS FOR CLEANING DRAINPIPES IN MOVABLE EQUIPMENT

(75) Inventors: Kiyomi Kanda, Hyogo; Takeshi Sugimoto, Kyoto, both of (JP)

(73) Assignee: Seiwa Pro Co., Ltd., Matsubara (JP)

( * ) Notice: Subject to any disclaimer, the term of this patent is extended or adjusted under 35 U.S.C. 154(b) by 179 days.

(21) Appl. No.: 09/624,226

(22) Filed: Jul. 24, 2000

(51) Int. Cl.[7] ............................................... B08B 9/032
(52) U.S. Cl. ................. 134/109; 134/169 R; 134/169 C
(58) Field of Search ........................... 134/109, 169 R, 134/169 A, 169 C

(56) References Cited

U.S. PATENT DOCUMENTS

| | | | | |
|---|---|---|---|---|
| 3,042,553 A | * | 7/1962 | Kearney et al. | 134/169 R X |
| 4,146,044 A | * | 3/1979 | Dow | 134/169 R X |
| 4,168,677 A | * | 9/1979 | Brown | 134/169 R X |
| 4,919,154 A | * | 4/1990 | Engle | 134/169 C X |
| 5,427,126 A | * | 6/1995 | Carney et al. | 134/169 C X |
| 5,873,944 A | * | 2/1999 | Lien et al. | 134/169 C X |
| 6,089,242 A | * | 7/2000 | Buck | 134/169 C X |

FOREIGN PATENT DOCUMENTS

| | | |
|---|---|---|
| JP | 60-67896 | 4/1985 |
| JP | 07-275822 | 10/1995 |

* cited by examiner

*Primary Examiner*—Philip Coe
(74) *Attorney, Agent, or Firm*—Armstrong, Westerman & Hattori, LLP

(57) ABSTRACT

A method for cleaning a plurality of drainpipes installed in a movable equipment by causing a flow of a cleaning solution through the drainpipes includes the steps of connecting provisional pipes to the plurality of drainpipes, feeding a cleaning solution into the provisional pipes and the drainpipes, and applying negative pressure suction force to the provisional pipes and the drainpipes to cause a flow of the cleaning solution in the opposite direction to a drain direction in normal use, to thereby clean the drainpipes.

11 Claims, 2 Drawing Sheets

METHOD AND APPARATUS FOR CLEANING DRAINPIPES IN MOVABLE EQUIPMENT

BACKGROUND OF THE INVENTION

1. Technical Field of the Invention

The present invention relates to a method for cleaning drainpipes in a movable equipment, and more particularly to, a method for cleaning a plurality of drainpipes installed at various locations in a movable equipment such as an airframe of a passenger airplane and connected to, for example, a washstand in a lavatory, a toilet seat and various solution storage tanks. The present invention also relates to an apparatus for cleaning such drainpipes.

2. Related Art

In a conventional cleaning method for cleaning drainpipes in a movable equipment, drainpipes to be cleaned are detached from the movable equipment, and carried to a place where a stationary cleaning apparatus is provided. Then, the drainpipes are set to the cleaning apparatus. After the cleaning, the cleaned pipes are detached from the cleaning apparatus and carried to a place where the movable equipment is stopping, and attached to the respective original portions in the movable equipment.

In a case where pipes equipped in a factory, which is not a movable equipment such as an airframe though, are cleaned by removing scale adhered to the inner surfaces of the pipes, the following high-pressure cleaning method was employed. In this cleaning method, impact force of speed energy converted from high-pressure energy is applied to the pipes while flowing a cleaning solution in the pipes in the discharge direction under pressure higher than a normal discharging pressure.

However, in the former cleaning method, considerable labor and time are required for detaching, carrying and attaching the pipes besides the cleaning operation itself. Therefore, in a case where drainpipes installed in a movable equipment, such as an airframe of a passenger airplane having many and complex drainpipes, are to be cleaned, enormous labor and cost are required for cleaning the drainpipes even in a single movable equipment. Accordingly, as an emergency cleaning method in a case where a drain capacity is reduced in between the periodic maintenance or an abrupt clogging of piping occurs, the aforementioned former cleaning method cannot be adopted when taking the required time and cost into consideration.

On the other hand, in the aforementioned high-pressure cleaning method, since the cleaning operation can be performed at any stopping place of the movable equipment such as an apron for a passenger airplane, both working labor and cleaning time can be reduced as compared with the aforementioned former cleaning method. However, even if an increased speed energy obtained by increasing the pressure is applied, it is very difficult to completely peel off adherent substances, such as scale, strongly adhered to the inner surfaces of the drainpipes because the cleaning solution is caused to flow in the same direction as that in normal use. Furthermore, a considerable time is required in order to perform the cleaning operation until a predetermined drain capacity is obtained, and frequent cleaning is also required for maintaining the predetermined drain capacity. In addition, since high pressure is applied to the drainpipes, leakage of the cleaning solution may occur at portions of the drainpipes where no leakage occurs under low pressure in normal use. Furthermore, with the progress of the cleaning operation under high pressure, normally concealed broken holes of the drainpipes may be exposed when adherent substances such as scale are removed, which causes leakage of a large amount of the cleaning solution.

SUMMARY OF THE INVENTION

An object of the present invention is to provide a method and an apparatus for cleaning drainpipes in a movable equipment, which can be performed at any place where a movable equipment is stopping with a reduced working labor and a greatly shortened cleaning time without causing any leakage of a cleaning solution while completely removing adherent substances such as scale in the drainpipes.

Another object of the present invention is to provide a method and an apparatus for cleaning drainpipes in a movable equipment, which can prevent a deterioration of a working environment and a peripheral environment due to a bad smell generated during the cleaning operation.

According to a first aspect of the present invention, a method for cleaning a plurality of drainpipes installed in a movable equipment by causing a flow of a cleaning solution through the drainpipes, the method including the steps of connecting provisional pipes to the respective drainpipes, feeding a cleaning solution into the provisional pipes and the drainpipes, and applying negative pressure suction force to the provisional pipes and the drainpipes to cause a flow of the cleaning solution in the opposite direction to a drain direction in normal use, to thereby clean the drainpipes.

According to a second aspect of the present invention, an apparatus for cleaning a plurality of drainpipes installed in a movable equipment by causing a flow of a cleaning solution through the drainpipes, the apparatus including provisional pipes to be connected to the respective drainpipes so as to allow a flow of a cleaning solution in the opposite direction to a drain direction in normal use, a cleaning solution preparation tank for preparing and storing the cleaning solution, a cleaning solution feeding pump for feeding the cleaning solution into the provisional pipes and the drainpipes, a vacuum pump for causing a flow of the cleaning solution filled in the provisional pipes and the drainpipes in the opposite direction by applying a negative pressure suction force to the provisional pipes and the drainpipes, a gas-liquid separation tank for separating the cleaning solution after having cleaned the drainpipes by flowing the cleaning solution in the opposite direction into gas components and liquid components, and a cleaning solution suction pump for returning the liquid components of the cleaning solution separated in the gas-liquid separation tank into the preparation tank.

According to the present invention as set forth above, the provisional pipes are connected to the respective drainpipes installed at various locations in a movable equipment, and the cleaning solution is caused to flow through the drainpipes in the opposite direction to a drain direction in normal use by applying a negative pressure suction force to the provisional pipes and the drainpipes. Therefore, it is possible to efficiently clean the plurality of drainpipes in a labor-saving manner at any place where the movable equipment is stopping. It is also possible to improve the ability for peeling off scale as compared with a high-pressure cleaning method because energy is exerted to the adherent substances such as scale, adhered to the inner surfaces of the drainpipes during a normal use, in the opposite direction to the growth direction of the adherent substances. Furthermore, the drainpipes are maintained under negative pressure during the cleaning operation. Therefore, leakage of the cleaning solution from the pipes can be assuredly prevented even if there is a pipe connection defects with no problem in normal use, and even if a small broken holes and the like are exposed by coming off the adherent substances such as scale with a progress of the cleaning operation.

Especially, the aforementioned cleaning method and apparatus can be effectively applied to an airframe of a passenger airplane which has many complex drainpipes and requires an emergency cleaning in case of a drain capacity reduction and a clogging of pipes which abruptly occur in between periodic maintenance. According to the method and apparatus, it is also possible to speedily perform a high quality cleaning of plurality of drainpipes so as to restore the predetermined drain capacity of the drainpipes without causing any leakage of the cleaning solution while parking the passenger airplane in a predetermined place.

In a case where the apparatus is equipped with a deodorization device for removing an odor of the gas components separated from the cleaning solution in a gas-liquid separation tank, it is possible to prevent a deterioration of a working environment and a peripheral environment by deodorizing a bad smell contained in a relatively large amount of gas components generated during the cleaning process of the drainpipes.

In a case where the apparatus includes a thermal expansion rubber seal member for sealing the gap between the outer peripheral portion of the provisional pipe inserted into the drainpipe from an opening portion thereof and the inner peripheral portion of the opening portion so that the negative pressure suction force can be applied to the drainpipes, a connection of these pipes becomes very simple and a preliminary work for cleaning can be performed easily and speedily. Furthermore, at a time of cleaning, a negative pressure due to the vacuum suction force can be applied to the drainpipes through the provisional pipes without a loss, so that it is possible to assuredly perform a predetermined cleaning of the drainpipes by the reverse flow of the cleaning solution.

Furthermore, in a case where each component of the apparatus except for the provisional pipe, is mounted on a vehicle body and the apparatus as a whole is constituted as an explosion-protection structure, it is possible to enlarge a scope of an applicable movable equipment to which a quick, effective and safety cleaning of the drainpipes by the cleaning apparatus can be performed.

Other objects and advantages of the present invention will become apparent from the description of the preferred embodiments, which may be modified in any manner without departing from the scope and spirit of the present invention.

DETAILED DESCRIPTION OF THE PREFERRED EMBODIMENTS

Preferred embodiments of a cleaning apparatus according to the present invention will now be described in detail with reference to the accompanying drawings.

Figure 1:
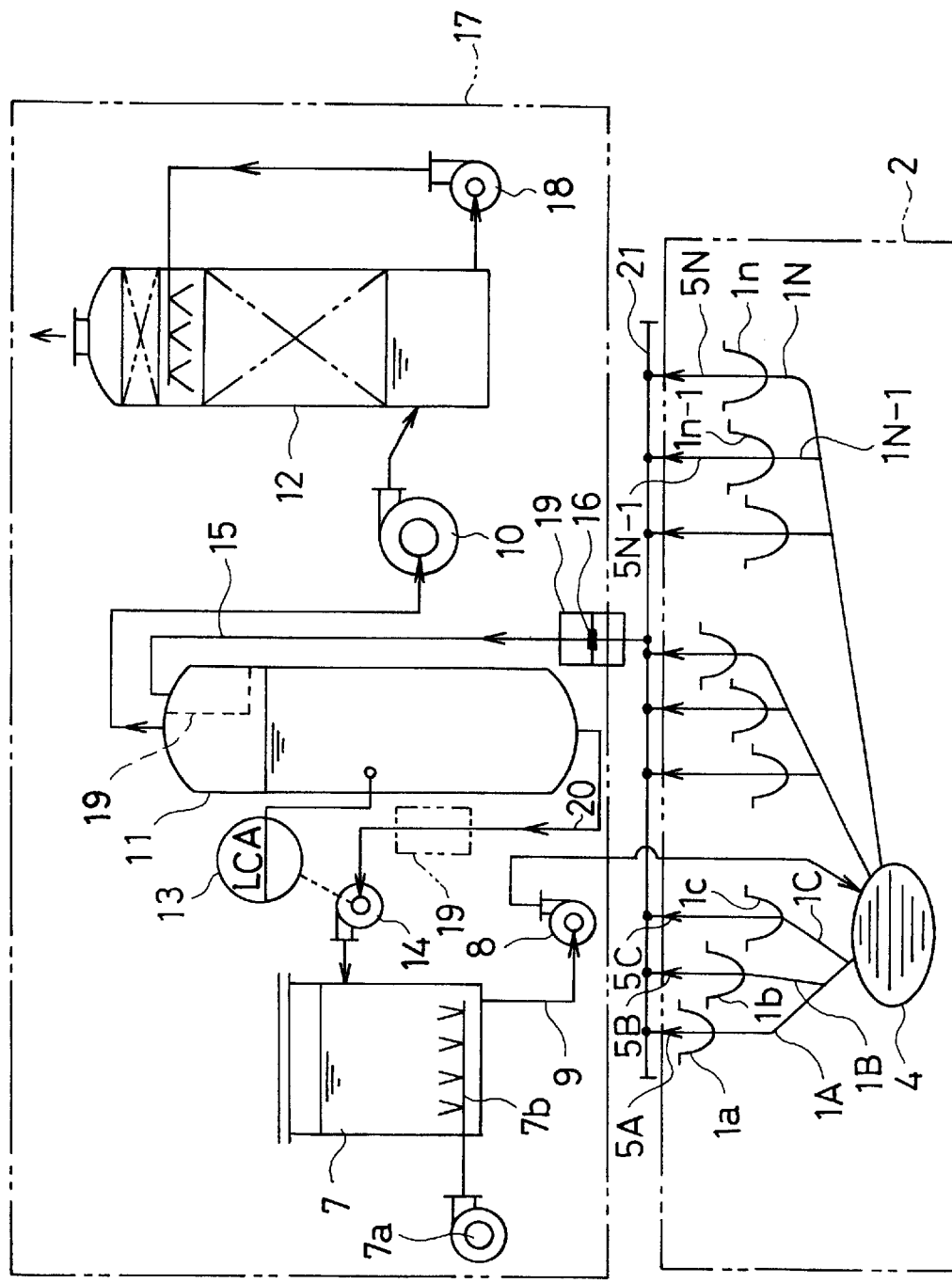
FIG. 1 is a schematic constitution diagram showing a whole cleaning apparatus for cleaning drainpipes in a movable equipment, which is used for performing a method for cleaning the drainpipes in the movable equipment according to the present invention.

FIG. 1 is a schematic constitution diagram of a whole apparatus for cleaning drainpipes 1A, 1B, 1C ... and 1N in an airframe 2 of a passenger airplane, which is used for performing a method for cleaning the drainpipes according to the present invention.

As shown in FIG. 1, the airframe 2 as a movable equipment is equipped with a plurality of drainpipes 1A, 1B, 1C ... and 1N to be cleaned by the cleaning apparatus according to the present invention. The drainpipes are installed at various locations of the airframe 2 and connected to, for example, a washstand of a lavatory, a toilet seat and various solution storage tanks equipped in the airframe 2.

Figure 2:
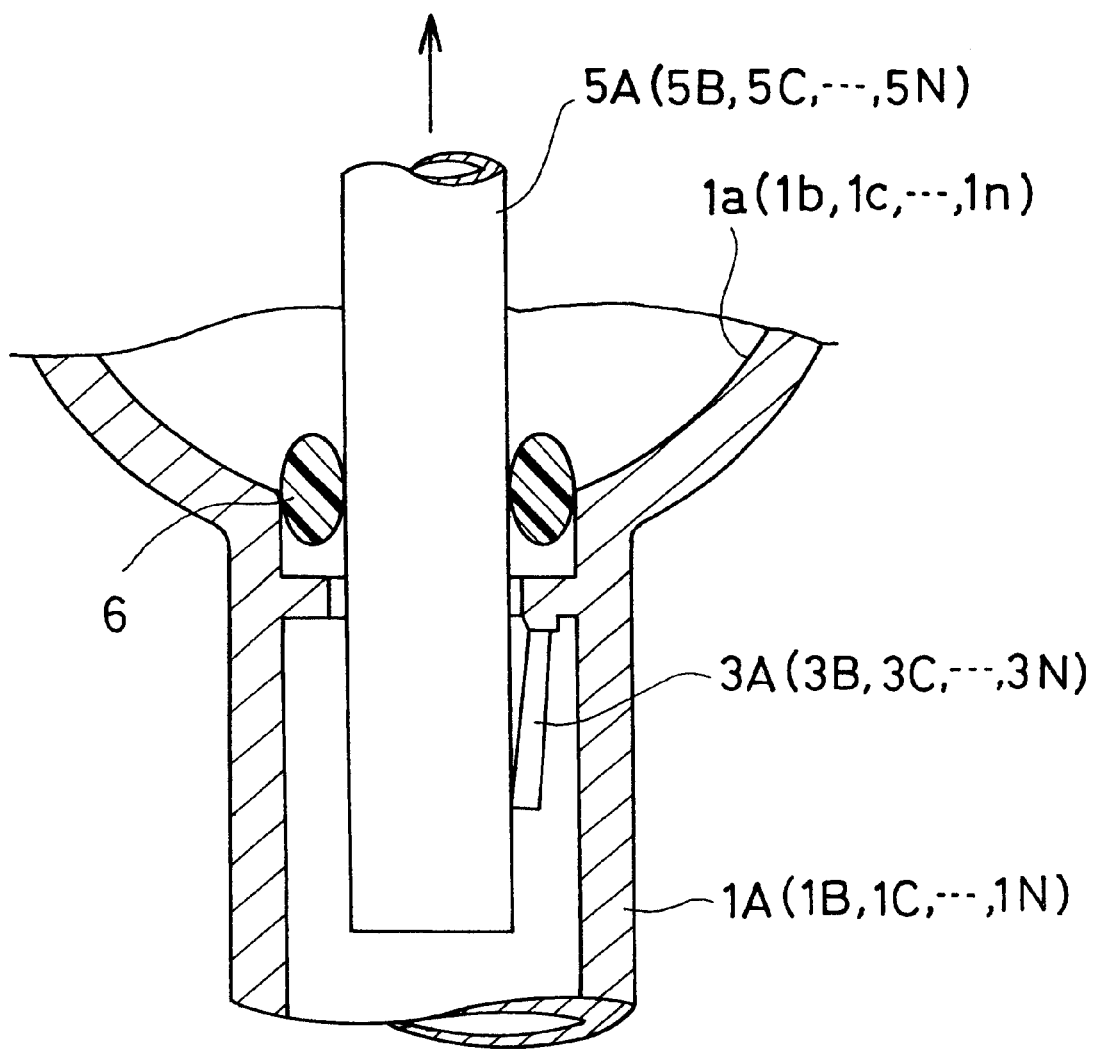
FIG. 2 is an enlarged vertical cross-sectional view showing a connecting structure between a drainpipe and a provisional pipe in the cleaning apparatus.

As shown in FIG. 2, the uppermost stream end portion of each drainpipe 1A (1B, 1C . . . 1N) is connected to the respective opening drain portion 1a (1b, 1c . . . 1n) of the washstand, the toilet seat or the like. At a connection portion between the opening drain portion 1a (1b, 1c . . . 1n) and the uppermost stream end portion of the drainpipe 1A (1B, 1C . . . 1N), a flapper 3A (3B, 3C . . . 3N) is provided so as to be biased in a normally closed direction.

As shown in FIG. 1, the downstream end portion of each drainpipe 1A (1B, 1C . . . 1N) is connected to a common solution collection tank (a sewage tan ) 4 equipped in the airframe 2.

The cleaning apparatus according to the present invention includes a plurality of provisional pipes 5A, 5B, 5C . . . 5N each made of a flexible tube and a single collective pipe 21 to which one end portion of each of the aforementioned plurality of provisional pipes is connected.

The other end portion of each provisional pipe 5A (5B, 5C . . . 5N) is inserted into the drainpipe 1A (1B, 1C . . . 1N) through the opening drain portion 1a (1b, 1c . . . 1n) with the flapper 3A (3B, 3C . . . 3N) pushed downward as shown in FIG. 2. In this insertion state, a thermal expansion rubber seal members 6 is interposed between the provisional pipe 5A (5B, 5C . . . 5N) and the opening portion 1a (1b, 1c . . . 1n) so that the outer peripheral portion of the provisional pipe 5A (5B, 5C . . . 5N) and the inner peripheral portion of the opening portion 1a (1b, 1c . . . 1n) are tightly sealed. Thus, the provisional pipes 5A, 5B, 5C . . . 5N are connected to the respective drainpipes 1A, 1B, 1C . . . 1N so that negative pressure suction force can be applied to the provisional pipes and the drainpipes. The thermal expansion rubber seal member 6 is preferably made of, for example, silicone rubber having an expansion coefficient of about 10% to about 40% at 180° C.

The cleaning apparatus further includes a cleaning solution preparation tank 7 for preparing a cleaning solution of a predetermined concentration. The tank 7 is provided with air nozzles 7b at its bottom portion for supplying air into the tank by operating a blower 7a connected to the air nozzles 7b. The cleaning solution is prepared by stirring water filled in the tank 7 into which organic powders are added while jetting out air from the air nozzles 7b.

The cleaning solution is fed into the solution collection tank 4 in the airframe 2 via a solution feeding provisional pipe 9 by operating a solution feed pump 8. The cleaning solution fed into the tank 4 is then introduced into the drainpipes 1A, 1B, 1C . . . 1N and the corresponding provisional pipes 5A, 5B, 5C . . . 5N.

The reference numeral 10 denotes a vacuum pump. The vacuum pump 10 applies negative suction force to the respective provisional pipes 5A, 5B, 5C . . . 5N and the respective drainpipes 1A, 1B, 1C . . . 1N connected to the former pipes through a below-mentioned solution suction pipe 15 and the collective pipe 21. This causes the cleaning solution filled in these pipes 5A, 5B, 5C . . . 5N and 1A, 1B, 1C . . . 1N to flow in the opposite direction to a drain direction in normal use. The reference numeral 11 denotes a gas-liquid separation tank for separating the cleaning solution, which is fed into the tank 11 through the solution suction pipe 15 after having flowed through the respective pipes 5A, 5B, 5C . . . 5N and 1A, 1B, 1C . . . 1N in the opposite direction due to the negative pressure suction force action of the vacuum pump 10 and thus having performed predetermined cleaning, into liquid components (cleaning solution) and gas components. The gas components are fed into a deodorization device 12 by the vacuum pump 10. On the other hand, the cleaning solution (liquid component) is drained from the bottom of the tank 11 by solution suction pump 14 having a level controller (LCA) 13 and returned to the cleaning solution preparation tank 7, and then prepared again therein.

In the aforementioned cleaning apparatus, the collective pipe 21 and the provisional pipes 5A, 5B, 5C . . . 5N are detachably connected to other equipments (i.e., the cleaning solution preparation tank 7, the solution feed pump 8, the solution feeding provisional pipe 9, the vacuum pump 10, the gas-liquid separation tank 11 and the solution suction pump 14, etc.) via a pipe coupling 16 provide at a part of the solution suction pipe 15. The equipments other than the collective pipe 21 and the provisional pipes 5A, 5B, 5C . . . 5N are mounted on a vehicle body 17 such as a truck.

The deodorization device 12 is of a solution circulation deodorization type for absorption-removing a bad odor in the gas components separated by the gas-liquid separation tank 11 by showering an absorption solution forcibly cycled by a circulation pump 18. However, in place of the aforementioned deodorization device, it may be of a biological deodorization type in which a bad odor in the gas components is removed by the proliferated organisms.

Furthermore, at a place where the pipe coupling 16 is provided at a part of the solution suction pipe 15 extending from the collective pipe 21 to the gas-liquid separation tank 11, a strainer 19 is provided for removing insoluble solid components mixed in the cleaning solution during the cleaning process. It is preferable that the strainer can be separated into two pieces in accordance with the separation of the pipe coupling 16 so as to remove the insoluble solid components generated during the cleaning operation of the drainpipes after the completion of the cleaning operation. However, the strainer may be provided at a part of the solution suction pipe 20 extending from the gas-liquid separation tank 11 to the preparation tank 7 as shown by the phantom line in FIG. 1, or it may be provided at the upper end portion of the gas-liquid separation tank 11 facing the tip opening portion of the solution suction pipe 15 as shown by the dotted line in FIG. 1.

Furthermore, $d_2G_4$-class motors are used for driving the blower 7a and respective pumps 8, 10, 14 and 18 so as to construct the whole apparatus as an explosion-protection structure. Thus, the igniting of the fuel in the passenger airplane can be avoided during the cleaning process of the drainpipes.

Next, the cleaning process of a plurality of drainpipes 1A, 1B, 1C . . . 1N installed at various places in the airframe 2 by using the aforementioned cleaning apparatus will be explained.

In a state that the collective pipe 21 and the respective provisional pipes 5A, 5B, 5C . . . 5N are separated from the equipments mounted on a vehicle by detaching the pipe coupling 16, cleaning preparation work is performed. In detail, as shown in FIG. 2, the respective provisional pipes 5A, 5B, 5C . . . 5N are connected to the respective drainpipes 1A, 1B, 1C . . . 1N in the airframe 2 so that negative pressure suction force can be applied thereto. In addition, the solution suction pipe 15 is connected to the collective pipe 21 via the pipe coupling 16 (see FIG. 1).

After the above-mentioned preparation work has been completed, the cleaning solution is prepared by operating the blower 7a. Then, the solution feed pump 8 is operated while preparing the cleaning solution in the cleaning solution preparation tank 7 to feed the cleaning solution into the solution collection tank (a sewage tank) 4 through the solution feeding provisional pipe 9. Thus, the cleaning solution is filled into the respective drainpipes 1A, 1B, 1C . . . 1N and the respective provisional pipes 5A, 5B, 5C . . . 5N provided between the solution collection tank 4 and the gas-liquid separation tank 11.

Next, the vacuum pump 1 and the circulation pump 18 are started to be driven to apply negative pressure suction force to the collective pipe 21, the respective provisional pipes 5A, 5B, 5C . . . 5N and the respective drainpipes 1A, 1B, 1C . . . 1N through the upper space in the gas-liquid separation tank 11 and the solution suction pipe 15. As result, the cleaning solution is caused to flow through the respective drainpipes 1A, 1B, 1C . . . 1N and the respective provisional pipes 5A, 5B, 5C . . . 5N in the opposite direction to a drain direction in normal use. This opposite direction flow of the leaning solution enables to peel off the scale adhered to the inner surfaces of the respective drainpipes 1A, 1B, 1C . . . 1N to clean the inner surfaces.

After this cleaning action, the cleaning solution and the gas components such as ammonia gas generated during the cleaning operation are fed into the gas-liquid separation tank 11 by way of the solution suction pipe 15 and the strainer 19 to be separated into liquid components (cleaning solution) and gas components. The gas components are fed into the deodorization device 12 by the vacuum pump 1 and subjected to a deodorization treatment and, thereafter, discharged to the atmosphere. On the other hand, the cleaning solution is drained from the bottom of the gas-liquid separation tank 11 by the solution suction pump is 14 subjected to ON/OFF control through the level controller (LCA) 13 and returned to the cleaning solution preparation tank 7. The cycled cleaning solution is prepared again to the cleaning solution of a predetermined concentration, which is used again in a cyclic manner.

As mentioned above, according to the aforementioned cleaning device, the cleaning solution is caused to flow through the drainpipes 1A, 1B, 1C . . . 1N in the opposite direction to a drain direction in normal use by applying the negative suction force to the cleaning solution. Therefore, the cleaning of the plurality of drainpipes 1A, 1B, 1C . . . 1N installed in the airframe 2 can be performed integrally, efficiently and in a labor-saving manner at an apron for the passenger airplane. In addition, since energy is exerted to the adherent substances such as scale adhered in the drainpipes 1A, 1B, 1C . . . 1N in the opposite direction to the adhesion growth direction of the adherent substances, the ability for peeling off the adherent substances is enhanced, which results in an increased cleaning speed and complete cleaning.

Furthermore, since the respective drainpipes 1A, 1B, 1C . . . 1N are maintained under negative pressure during the cleaning process, even if there are connection defects of the drainpipes and/or even if small broken holes or the like are exposed when the adherent substances such as scale are peeled off with the progress of the cleaning operation, the leakage of the cleaning solution is prevented, causing no peripheral pollution. Moreover, since the deodorization treatment of the gas components generated during the cleaning operation is performed, the working environment and peripheral environment are improved, resulting in a sanitary, safe and excellent cleaning operation.

In the above-mentioned embodiment, the cleaning apparatus has been applied to clean drainpipes in the airframe of the passenger airplane. However it can be also applied to clean drainpipes in a movable machine body such as a railway vehicle or a bus, etc., and the same effect as mentioned above is obtained in that case.

As mentioned above, according to the present invention, it is possible to efficiently clean the plurality of drainpipes in a labor-saving manner at any place where the movable equipment is stopping. It is also possible to improve the ability for peeling off scale as compare with a high-pressure cleaning method because energy is exerted to the adherent substances such as scale, adhered to the inner surfaces of the drainpipes during a normal use, in the opposite direction to the growth direction of the adherent substances. Furthermore, the drainpipes are maintained under negative pressure at a time of cleaning. Therefore, leakage of the cleaning solution from the drainpipes can be assuredly prevented even if there is a connection defects of the drainpipes having no problem in normal use, and even if small broken holes or the like are exposed when the adherent substances such as scale are peeled off with the progress of the cleaning operation.

Especially, the aforementioned cleaning method and apparatus can be effectively applied to an airframe of a passenger airplane which has many complex drainpipes and requires an emergency cleaning in case of a drain capacity reduction and a clogging of pipes which abruptly occur in between periodic maintenance. According to the method and apparatus, it is also possible to speedily perform a high quality cleaning of plurality of drainpipes to restore the predetermined drain capacity of the drainpipes without causing any leakage of the cleaning solution while parking the passenger airplane in a predetermined place.

In a case where the apparatus is equipped with a deodorization device for removing the odor of gas components separated from the cleaning solution in the gas-liquid separation tank, it is possible to prevent a deterioration of a working environment and a peripheral environment by deodorizing a bad smell contained in a relatively large amount of gas components generated during the cleaning operation of the drainpipes.

In a case where the apparatus includes a thermal expansion rubber seal member for sealing the gap between the outer peripheral portion of the provisional pipe inserted into the drainpipe from an opening portion thereof and the inner peripheral portion of the opening portion so that the negative pressure suction force can be applied to the drainpipes, a connection of both the pipes becomes very simple and a preliminary work for cleaning can be performed easily and speedily. Furthermore, at a time of cleaning, a negative pressure due to the vacuum suction force can be applied to the drainpipes through the provisional pipes without a loss, so that it is possible to assuredly perform a predetermined cleaning of the drainpipes by the reverse flow of the cleaning solution.

Furthermore, in a case where each component of the apparatus except for the provisional pipes is mounted on a vehicle body and the apparatus as a whole is constituted as an explosion-protection structure, it is possible to enlarge the scope of the applicable movable equipment to which a quick, effective and safety cleaning operation of the drainpipes by the cleaning apparatus can be perform.

The terms and expressions which have been employed herein are used as terms of description and not of limitation, and there is no intent, in the use of such terms and expressions, of excluding any equivalents of the features shown and described or portions thereof, but it should be recognized that various modifications are possible within the scope of the invention claimed.

The disclosure of Japanese Patent Application No. Hei 10-5674 filed on Jan. 14, 1998 is incorporated by reference in its entirety.

What is claimed is:

1. An apparatus for cleaning a plurality of drainpipes installed in a movable equipment by causing a flow of a cleaning solution through the drainpipes, the apparatus comprising:

provisional pipes to be connected to the respective drainpipes so as to allow a flow of a cleaning solution in the opposite direction to a drain direction in normal use;

a cleaning solution preparation tank for preparing and storing the cleaning solution;

a cleaning solution feeding pump for feeding the cleaning solution into the provisional pipes and the drainpipes;

a vacuum pump for causing a flow of the cleaning solution filled in the provisional pipes and the drainpipes in the opposite direction by applying a negative pressure suction force to the provisional pipes and the drainpipes;

a gas-liquid separation tank for separating the cleaning solution after having cleaned the drainpipes by flowing the cleaning solution in the opposite direction into gas components and liquid components; and a cleaning solution suction pump for returning the liquid components of the cleaning solution separated in the gas-liquid separation tank into the preparation tank.

2. The apparatus for cleaning a plurality of drainpipes as recited in claim 1, wherein the movable equipment is an airframe of a passenger airplane.

3. The apparatus for cleaning a plurality of drainpipes as recited in claim 2, further comprising a deodorization device for removing an odor of the gas components separated in the gas-liquid separation tank.

4. The apparatus for cleaning a plurality of drainpipes as recited in claim 3, wherein each component of the apparatus except for the provisional pipes is mounted on a vehicle body.

5. The apparatus for cleaning a plurality of drainpipes as recited in claim 2, further comprising a thermal expansion rubber seal member for sealing a gap between an outer peripheral portion of the provisional pipe inserted into the drainpipe from an opening portion thereof and an inner peripheral portion of the opening portion so that the negative pressure suction force can be applied to the drainpipes.

6. The apparatus for cleaning a plurality of drainpipes as recited in claim 2, wherein each component of the apparatus except for the provisional pipes is mounted on a vehicle body.

7. The apparatus for cleaning a plurality of drainpipes as recited in claim 1, further comprising a deodorization device for removing an odor of the gas components separated in the gas-liquid separation tank.

8. The apparatus for cleaning a plurality of drainpipes as recited in claim 7, wherein each component of the apparatus except for the provisional pipes is mounted on a vehicle body.

9. The apparatus for cleaning a plurality of drainpipes as recited in claim 1, further comprising a thermal expansion rubber seal member for sealing a gap between an outer peripheral portion of the provisional pipe inserted into the drainpipe from an opening portion thereof and an inner peripheral portion of the opening portion so that the negative pressure suction force can be applied to the drainpipes.

10. The apparatus for cleaning a plurality of drainpipes as recited in claim 1, wherein each component of the apparatus except for the provisional pipes is mounted on a vehicle body.

11. The apparatus for cleaning a plurality of drainpipes as recited in any one of claims 1 to 10, wherein the apparatus as a whole is constituted as an explosion-protection structure.

* * * * *